United States Patent Office 2,703,329
Patented Mar. 1, 1955

2,703,329

γ,γ-DISUBSTITUTED-δ-OXOCAPRONITRILES

Everett M. Schultz, Ambler, Pa., assignor to Merck & Co., Inc., a corporation of New Jersey No Drawing. Application August 21, 1952,
Serial No. 305,692

4 Claims. (Cl. 260—465)

This invention is concerned with certain new and useful chemical compounds. It is more particularly concerned with γ,γ-disubstituted-δ-oxocapronitriles of the general formula:

(I)

in which Y is hydrogen, a lower alkyl, halogen, or an alkoxy, advantageously a lower-alkoxy, radical.

These compounds are obtained by the cyanoethylation of ketones of the general formula:

(II)

where the ketones are known. In those instances where the ketones are not available, they can be prepared by one of several methods. For example, a mono-substituted acetone of the general formula:

(III)

can be chlorinated or, preferably, brominated and then subjected to a Friedel-Crafts reaction to produce the ketone of the above general Formula II. Cyanoethylation of the ketone is then accomplished by the reaction of ketones of the above Formula II with acrylonitrile preferably in solution and in the presence of a basic catalyst such as, for example, benzyltrimethylammonium hydroxide, sodium hydroxide, and the like. In general, the ketone is dissolved in a solvent such as, for example, t-butyl alcohol or benzene, and added together with the catalyst to a reaction vessel equipped with stirrer, reflux condenser, and means for addition of the acrylonitrile. The acrylonitrile is added to the reaction mixture slowly with stirring and the temperature of the reaction is maintained, by cooling, at approximately 20–30° C. After the addition of the acrylonitrile is completed the reaction mixture is stirred for approximately two hours. The reaction mixture is then acidified with a mineral acid, the solvent is removed under diminished pressure, and the solid residue is purified by recrystallization from a suitable solvent, such as, for example, heptane. If the residue is an oil, it is taken up in ether, the ether solution washed with water, and dried over sodium sulfate. Then the ether is removed by evaporation and the residue distilled under vacuum.

These new compounds are useful for the preparation of a variety of chemical compounds possessing physiological activity. For example, these γ,γ-disubstituted-δ-oxocapronitriles are useful as starting materials for the preparation of δ-keto acids as described in my presently pending application Serial No. 179,898 filed August 16, 1950, now abandoned, entitled γ,γ-Disubstituted-δ-Oxocaproic Acids.

This application is a continuation-in-part of the United States patent application Serial No. 179,895, filed August 16, 1950, now abandoned.

The invention is illustrated by but not restricted to the following examples describing the preparation of compounds falling within the scope of the general Formula I, above:

*Example 1.—γ,γ-Diphenyl-δ-oxocapronitrile.*—90 g. (0.43 mole) diphenylacetone, 9 g. of 40% aqueous solution of benzyltrimethylammonium hydroxide, and 1150 ml. t-butyl alcohol were placed in a two-liter, three-neck flask equipped with a reflux condenser, stirrer, and dropping funnel. The flask was placed in cooling bath and while the temperature of the reaction mixture maintained at approximately 25° C., 27.0 g. (0.5 mole) acrylonitrile was added dropwise over a period of approximately one hour. The cooling bath then was removed and stirring was continued for approximately one hour after which the reaction mixture was acidfied with concentrated sulfuric acid. The t-butyl alcohol solvent was removed by distillation under diminished pressure. There resulted a crystalline slurry that was collected on a filter and washed with water. The crystalline material on the filter was recrystallized from 900 ml. n-heptane and was then recrystallized from isopropyl alcohol. There was obtained (66% yield) γ,γ-diphenyl-δ-oxocapronitrile, M. P. 113.5–114.5° C.

*Example 2.—γ-(p-Chlorophenyl)-γ-phenyl-δ-oxocapronitrile.*—A solution of p-chlorophenylacetone, 52 g. (0.308 mole), and benzene (300 ml.) was placed in a flask that was protected from external moisture by means of a drying tube. Bromine, 50.3 g. (0.314 mole), was added dropwise with stirring over five minutes. Dry nitrogen was passed through the solution for two hours. A second flask, also protected from atmospheric moisture by means of a drying tube, containing benzene (170 ml.) and anhydrous aluminum chloride, 84 g. (0.63 mole) was subjected to gentle refluxing conditions. The contents of the first flask were added dropwise to the gently refluxed contents of the second flask over a period of 75 minutes. After refluxing for an additional hour, the solution was cooled and poured into a mixture of ice (500 g.) and concentrated hydrochloric acid (100 ml.). An aqueous layer was extracted three times with ether and the ether extracts added to the benzene layer. The combined organic layers were washed with water, then sodium bicarbonate and finally dried over anhydrous sodium sulfate. The solvents were removed by distillation and the residues fractionated at reduced pressure. A total of 57.5 g. (76%) of 1-(p-chloropenyl)-1-phenyl-2-propanone, boiling at 148–156° C. at 0.3 mm. was collected. This product was further purified by fractional distillation, B. P. 148–150° C. at 0.3 mm., $n_D^{25}$ 1.5848. A solution of the thus prepared 1-(p-chlorophenyl)-1-phenyl-2-propanone, 22.8 g. (0.093 mole), in t-butyl alcohol (170 ml.) was treated with 40% aqueous benzyltrimethylammonium hydroxide (3 ml.). A solution of acrylonitrile, 5.95 g., (0.11 mole) and t-butyl alcohol (30 ml.) was added dropwise, with stirring over a period of one hour, while the temperature was maintained at 22–24° C. The solution was stirred at room temperature for an additional hour. The temperature was then raised to 38–42° C. and maintained for six hours. During this time, more benzyltrimethylammonium hydroxide (total quantity 1.5 ml.) was added in four equal portions at one and one-half hour intervals. The mixture was allowed to stand overnight. It was then neutralized with sulfuric acid and the solvent removed at reduced pressure. The residue was dissolved in ethyl acetate, washed with water, dried over anhydrous sodium sulfate, and the solvent removed by distillation at reduced pressure. A total of 18.6 g. (67% yield) of γ-(p-chlorophenyl) - γ - phenyl-δ-oxocapronitrile, B. P. 185–190° C. at 0.12 mm., was collected. After standing, the product which solidified was recrystallized from isobutyl alcohol yielding crystalline γ-(p-chlorophenyl)-γ-phenyl-δ-oxocapronitrile, M. P. 92–93° C.

*Example 3.*—γ-(*p-Chlorophenyl*) - γ - *phenyl-δ-oxocapronitrile*.—A solution of phenylacetone, 111 g. (0.828 mole), in chlorobenzene (1050 ml.) was placed in a flask that was protected from external moisture by means of a dry tube. The solution was stirred and bromine, 135 g. (0.84 mole), was added dropwise over five minutes. Dry nitrogen was passed through the solution for three hours. A second flask containing chlorobenzene (450 ml.) and aluminum chloride, 225 g. (0.168 mole), was equipped like the first flask. The contents were stirred and heated on a steam bath and the contents of the first flask added dropwise over 70 minutes. After heating for an additional hour, the solution was cooled and poured into a mixture of crushed ice (1500 g.) and concentrated hydrochloric acid (300 ml.). The water layer was extracted with four portions of ether (200 ml. each). The combined organic extracts were dried over anhydrous sodium sulfate and the solvents removed by distillation. The residue was fractionated at reduced pressure. A total of 147 g. (72% yield) of 1-(p-chlorophenyl)-1-phenyl-2-propanone, B. P. 150–156° C. at 0.4 mm. was collected. This product was purified by further fractional distillation, yielding a product with B. P. 142–147° C. at 0.18 mm., $n_D^{25}$ 1.5845. A solution of the thus prepared 1-(p-chlorophenyl)-1-phenyl-2-propanone, 22.8 g. (0.093 mole), in t-butyl alcohol (170 ml.) was treated with 40% aqueous benzyltrimethylammonium hydroxide (3 ml.). A solution of acrylonitrile, 5.95 g., (0.11 mole) and t-butyl alcohol (30 ml.) was added dropwise, with stirring over a period of one hour, while the temperature was maintained at 22–24° C. The solution was stirred at room temperature for an aditional hour. The temperature was then raised to 38–42° C. and maintained for six hours. During this time, more benzyltrimethylammonium hydroxide, (total quantity 1.5 ml.), was added in four equal portions at one and one-half hour intervals. The mixture was allowed to stand overnight. It was then neutralized with sulfuric acid and the solvent removed at reduced pressure. The residue was dissolved in ethyl acetate, washed with water, dried over anhydrous sodium sulfate, and the solvent removed by distillation at reduced pressure. A total of 18.6 g. (67% yield) of γ-(p-chlorophenyl) - γ - phenyl-δ-oxocapronitrile, B. P. 185–190° C. at 0.12 mm., was collected. After standing, the product which solidified was recrystallized from isobutyl alcohol yielding crystalline γ-(p-chlorophenyl)-γ-phenyl-δ-oxocapronitrile, M. P. 92–93° C.

The 1-(p-chlorophenyl)-1-phenyl - 2 - propanone prepared as described in Examples 2 and 3 were each separately converted to its 2,4-dinitrophenylhydrazone derivative, each having the M. P. of 173.5–174° C. This proves that in each case the p-chlorophenyl compound was obtained.

*Example 4.*—γ-(*p-Tolyl*)-γ-*phenyl* - δ - *oxocapronitrile*.—The bromination involving phenylacetone, 111 g. (0.828 mole), bromine 135 g. (0.84 mole), and toluene (600 ml.) and the Friedel-Crafts reaction with bromobenzene, aluminum chloride (225 g.) and toluene (450 ml.) was carried out in a manner similar to that described in Example 3 for the preparation of 1-(p-chlorophenyl)-1-phenyl-2-propanone. A total of 122 g. (65% yield) of 1-phenyl-1-(p-tolyl)-2-propanone was obtained. B. P. 140–145° C. at 0.6 mm. This product was further purified by fractional distillation, B. P. 143–148° C. at 0.25 mm., $n_D^{25}$ 1.5728. A solution of the thus obtained 1-(p-tolyl)-1-phenyl-2-propanone, 63.9 g. (0.285 mole), t-butyl alcohol (425 ml.) and 40% aqueous benzyltrimethylammonium hydroxide (6.05 g.) was stirred and treated dropwise with a solution of acrylonitrile, 18.15 g. (0.342 mole) and t-butyl alcohol (75 ml.). The addition required 45 minutes and the temperature was maintained at 22–24° C. The solution was then stirred at room temperature for two hours. Stirring was continued while the temperature was raised to 38–42° C. and maintained for an additional three and one-half hours. The mixture was neutralized with dilute sulfuric acid and the solvent removed by distillation at reduced pressure. The residue was dissolved in ethyl acetate and the solution washed with water and dried over sodium sulfate. The solvent was removed by distillation at reduced pressure and the residue fractionated. A total of 79 g. (74% yield) of γ-(p-tolyl)-γ-phenyl-δ-oxocapronitrile, B. P. 168–174° C. at 0.12 mm., was collected. Upon standing, a solid product was obtained, which, after recrystallization from heptane and then from isopropyl alcohol yielded the product in crystalline form, M. P. 96–97° C.

*Example 5.* — γ-(*m-Methoxyphenyl*)-γ-*phenyl-δ-oxocapronitrile*. — m-Methoxyphenylacetone, 32.8 g. (0.2 mole), was dissolved in benzene (200 ml.) and bromine, 32 g. (0.2 mole), was added dropwise over a period of 10 minutes, maintaining the temperature at 5–10° C. This solution was then added dropwise to a solution of benzene (125 ml.) and aluminum chloride, 57.3 g. (0.43 mole), over a period of an hour. The temperature was maintained at 15–20° C. during the addition. The mixture was stirred another hour at room temperature and then poured onto a mixture of crushed ice (400 g.) and concentrated hydrochloric acid (75 ml). The aqueous layer was separated and extracted with ether. The combined organic layers were washed with water, then with sodium bicarbonate. After drying over sodium sulfate, the solvents were removed at reduced pressure and the residue fractionated, yielding 1-(m-methoxyphenyl)-1-phenyl-2-propanone. A solution of the thus obtained 1-(m-methoxyphenyl)-1-phenyl-2-propanone, 48 g. (0.2 mole), t-butyl alcohol (400 ml.) and 40% aqueous benzyltrimethylammonium hydroxide (4.3 ml.) was stirred and treated dropwise with a solution of acrylonitrile, 23.2 g. (0.25 mole), and t-butyl alcohol (60 ml.). The addition required 45 minutes and the temperature was maintained at 25° C. After stirring for four hours at 40° C. the mixture was cooled, neutralized with dilute sulfuric acid and the solvent removed at reduced pressure. The residue was dissolved in ethyl acetate and the solution washed with water and dried over sodium sulfate. The solvent was removed by distillation at reduced pressure and the residue fractionated yielding γ-(m-methoxyphenyl)-γ-phenyl-δ-oxocapronitrile.

Additional compounds falling within the scope of general Formula I above are prepared by following substantially the same procedures described in Examples 1 through 5. Thus, by replacing the p-chlorophenylacetone employed in Example 2 by an equimolecular quantity of p-bromophenylacetone, there is obtained γ-(p-bromophenyl) - γ - phenyl-δ-oxocapronitrile. This same end product is likewise obtained when an equimolecular quantity of bromobenzene is substituted for the chlorobenzene employed in Example 3. Similarly, when m-chlorophenylacetone or m-bromophenylacetone is substituted in an equimolecular quantity for the p-chlorophenylacetone employed in Example 2, there is obtained, respectively, γ-(m-chlorophenyl)-γ-phenyl-δ-oxocapronitrile and γ-(m-bromophenyl)-γ-phenyl-δ-oxocapronitrile. The procedures of Examples 2 and 3 can also be employed for the preparation of γ-(p-chlorophenyl)-γ-(p-chlorophenyl)-δ-oxocapronitrile by replacing the benzene employed in the Friedel-Crafts reaction of Example 2 or the phenylacetone of Example 3 by an equivalent amount of p-chlorobenzene or p-chlorophenylacetone respectively.

Other lower-alkyl-phenyl derivatives can be prepared by substantially the same process described in Example 4. Thus by substituting the toluene employed in Example 4 by an equimolecular quantity of ethylbenzene, butylbenzene, or the like, there is obtained the corresponding γ-(p-ethylphenyl)-γ-phenyl-δ-oxocapronitrile and γ-(p-butylphenyl)-γ-phenyl - δ - oxocapronitrile respectively. Or, when in Example 4, phenylacetone is replaced by an equimolecular quantity of p-tolylacetone or p-propylphenylacetone, there is obtained respectively γ,γ-di-(p-tolyl)-δ-oxocapronitrile and γ-(p-tolyl) - γ - (p-propylphenyl)-δ-oxocapronitrile.

m- or p-ethoxyphenylacetone can similarly be employed in place of m-methoxyphenylacetone in Example 5 to yield the corresponding γ-(m-ethoxyphenyl)-γ-phenyl-δ-oxocapronitrile and γ-(p-ethoxyphenyl)-γ-phenyl-δ-oxocapronitrile.

What is claimed is:
1. A compound of the general formula
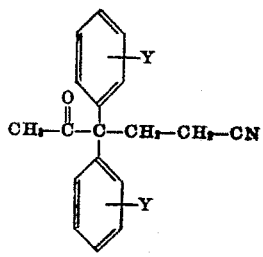
wherein Y is a member of the group consisting of hydrogen, a lower-alkyl, halogen, and lower-alkoxy radicals.
2. γ,γ-diphenyl-δ-oxocapronitrile.
3. γ-(p-chlorophenyl)-γ-phenyl-δ-oxocapronitrile.
4. γ-(p-tolyl)-γ-phenyl-δ-oxocapronitrile.
References Cited in the file of this patent
Henecka, Chem. Abstracts, vol. 44, col. 2521 (1950), (effective date 1949).